United States Patent [19]

Hess et al.

[11] Patent Number: 5,750,813
[45] Date of Patent: May 12, 1998

[54] PROCESS FOR THE PREPARATION OF POLYOLEFIN WAXES

[75] Inventors: Reiner Hess, Gersthofen; Hartmut Voigt, Königstein/Taunus; Hans-Friedrich Herrmann, Darmstadt; Ludwig Böhm, Hattersheim/Main; Walter Spaleck, Liederbach; Gerd Hohner, Gersthofen, all of Germany

[73] Assignee: Clarian & GmbH, Frankfurt, Germany

[21] Appl. No.: 353,144

[22] Filed: Dec. 9, 1994

Related U.S. Application Data

[63] Continuation-in-part of Ser. No. 478,359, Jun. 7, 1995, which is a continuation of Ser. No. 66,578, May 26, 1993, abandoned, which is a continuation of Ser. No. 166,296, Dec. 13, 1993, abandoned.

[30] Foreign Application Priority Data

Dec. 15, 1992 [DE] Germany .................. 4242203

[51] Int. Cl.⁶ .................................................. C10L 1/16
[52] U.S. Cl. .......................... 585/12; 585/10; 585/18; 585/512; 585/946; 526/153; 526/162
[58] Field of Search ............... 585/12, 10, 18, 585/512, 946; 526/152, 162

[56] References Cited

U.S. PATENT DOCUMENTS

| | | | |
|---|---|---|---|
| 3,951,935 | 4/1976 | Engelmann | 526/129 |
| 4,754,007 | 6/1988 | Pullukat | |
| 4,962,248 | 10/1990 | Winter et al. | 585/12 |
| 4,962,262 | 10/1990 | Winter | |
| 5,023,388 | 6/1991 | Luker et al. | |
| 5,304,614 | 4/1994 | Winter et al. | 526/127 |

FOREIGN PATENT DOCUMENTS

| | | |
|---|---|---|
| 625 142 | 7/1992 | Australia . |
| 2033805 | 8/1991 | Canada . |
| 0 161 060 | 11/1985 | European Pat. Off. . |
| 0 321 851 | 12/1988 | European Pat. Off. . |
| 0 321 852 | 6/1989 | European Pat. Off. . |
| 416 566 | 3/1991 | European Pat. Off. . |
| 442 300 | 8/1991 | European Pat. Off. . |
| 1 520 609 | 8/1969 | Germany . |
| 4134088 | 4/1993 | Germany . |
| 42 17 878 | 11/1993 | Germany . |
| 1 311 013 | 3/1973 | United Kingdom . |

OTHER PUBLICATIONS

European Search Report 93 10 8106, May 18, 1994.

*Primary Examiner*—Gary P. Straub
*Assistant Examiner*—Thomas G. Dunn, Jr.
*Attorney, Agent, or Firm*—Connolly & Hutz

[57] ABSTRACT

A process for the preparation of a polyolefin wax by polymerization or copolymerization of olefins or diolefins in suspension and in the presence of a catalyst. The process utilizes a metallocene and a cocatalyst, wherein the metallocene is a compound of the formula I

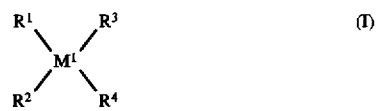

in which $M^1$ is a metal of group IVb, Vb or VIb of the Periodic Table of Elements, $R^1$ and $R^2$ are identical or different and are a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group or a halogen atom and $R^3$ and $R^4$ are identical or different and are a mononuclear or polynuclear hydrocarbon radical which may form a sandwich structure with the central atom $M^1$, low-boiling hydrocarbons having 3 or 4 carbon atoms or low-boiling halogenated hydrocarbons are used as suspending agents and the heat of reaction is removed by evaporative cooling.

22 Claims, 1 Drawing Sheet

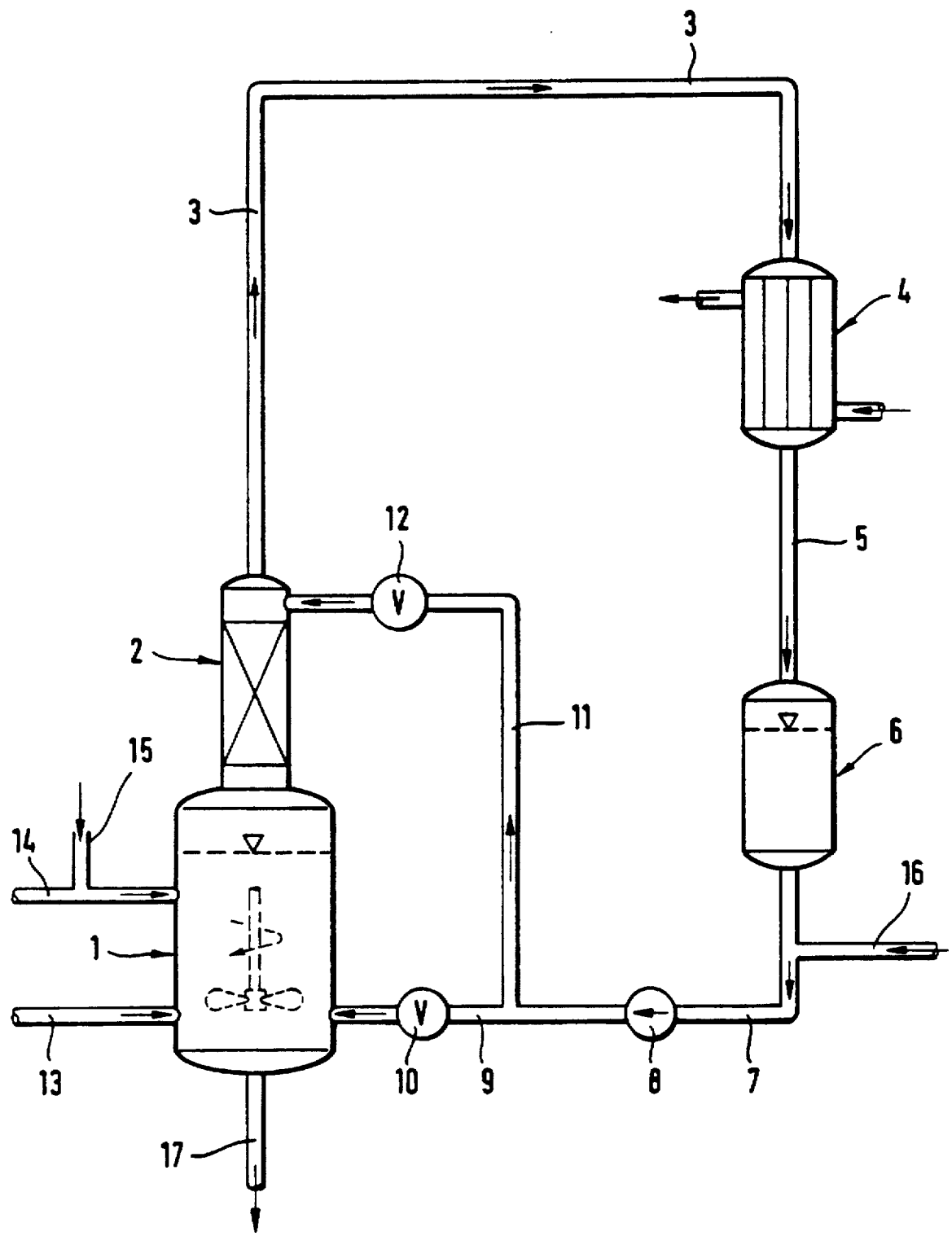

PROCESS FOR THE PREPARATION OF POLYOLEFIN WAXES

This application is a continuation-in-part of Ser. No. 08/478,359 which was filed Jun. 7, 1995 which in turn is a continuation of Ser. No. 08/066,578 which was filed May 26, 1993 and is now abandoned and this application is a continuation of 08/166,296, filed Dec. 13, 1993, now abandoned.

BACKGROUND OF THE INVENTION

The present invention relates to a process for the preparation of polyolefin waxes having a low residual ash content.

Polyolefin waxes, in particular polyethylene waxes, are important for a large number of applications. In particular, highly crystalline waxes are attracting increasing interest for mixing with abrasion-resistant printing inks, for the matting of paints and for the preparation of emulsifiable waxes for cleaning agents.

Processes for the preparation of polyolefin waxes at temperatures above 100° C. in solution in a high-boiling hydrocarbon are known (cf. British Patent No. 1,311,013 and U.S. Pat. No. 3,951,935). A suspension polymerization at temperatures below the wax melting point is unsuccessful owing to the high solubility and/or the good swelling capacity of these products.

It was found that waxes are soluble only to a negligible extent, if at all, in low-boiling hydrocarbons, in particular propane, and consequently a suspension process is also possible for semicrystalline waxes (cf. German Patent Application No. 4,217,378). This suspension polymerization process is economically advantageous compared with the solution process, owing to the simpler separation of the suspending agent and the lower viscosity of the system.

A major problem in the suspension polymerization, in particular with the use of soluble catalyst systems, is the build-up of wall deposits, which hinders the jacket cooling of the reactors. Particularly when the ratio of reactor surface area to reactor volume becomes more disadvantageous through the construction of larger reactors, uncontrollable heating of the polymerization system may occur as a result of the prevention of heat transfer.

It was therefore the object to find a polymerization process in which polyolefin waxes can be prepared without the disadvantages described, using metallocene catalysts.

It was found that, in the suspension polymerization of ethylene and other olefins in propane using metallocene catalyst systems, cooling of the reactor can be carried out by condensation of vapor ("evaporative cooling"), and that reactor deposits are avoided as a result.

SUMMARY OF THE INVENTION

The invention thus relates to a process for the preparation of a polyolefin wax by polymerization or copolymerizatin of olefins or diolefins at a temperature of −40° to 100° C., at a pressure of 0.5 to 120 bar, in suspension and in the presence of a catalyst comprising a metallocene and a cocatalyst, wherein the metallocene is a compound of the formula I

in which $M^1$ is a metal of group IVb, Vb or VIb of the Periodic Table of Elements, $R^1$ and $R^2$ are identical or different and are a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group or a halogen atom and $R^3$ and $R^4$ are identical or different and are a mononuclear or polynuclear hydrocarbon radical which may form a sandwich structure with the central atom $M^1$, low-boiling hydrocarbons having 3 or 4 carbon atoms or low-boiling halogenated hydrocarbons are used as suspending agents and the heat of reaction is removed by evaporative cooling.

In the process according to the invention, the monomers used are olefins, diolefins and other unsaturated hydrocarbons having 2 to 18 carbon atoms. Such monomers are cyclic, polycyclic, linear or branched unsaturated hydrocarbons. Examples of these are ethylene, propylene, 1-butene, 1-pentene, 1-hexene, 1-octene, 4-methyl-1-pentene, styrene or cyclic olefins, such as cyclopentene, cyclohexene, norbornene, 1,4,5,8-dimethano-1,2,3,4,4a,5,8,8a-octahydronaphthalene (DMON) and their structural derivatives, as well as diolefins, such as norbornadiene, 1,3-butadiene, 1,4-pentadiene, 1,4- or 1,5-hexadiene, 1,7-octadiene or 1,3- or 1,5-cyclooctadiene. The polymerization of ethylene or propylene and the copolymerization of ethylene or propylene with an olefin having 3 to 10 carbon atoms is preferred, and particularly preferred copolymer waxes are ethylene/propylene, ethylene/1-butene and ethylene/1-hexene polymer waxes and ethylene/propylene/1-butene terpolymer waxes.

BRIEF DESCRIPTION OF THE DRAWING

The sole Figure of the Drawing is a schematic illustration of an apparatus suitable for carrying out the process of this invention.

The polymerization is carried out in the presence of a metallocene catalyst system.

Suitable highly active metallocene catalyst systems for the preparation of polyolefin waxes in low boilers comprise a metallocene and a cocatalyst.

The metallocene is a compound of the formula I

in which $M^1$ is a metal of group IVb, Vb or VIb of the Periodic Table of Elements, $R^1$ and $R^2$ are identical or different and are a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group or a halogen atom and $R^3$ and $R^4$ are identical or different and are a mononuclear or polynuclear hydrocarbon radical which may form a sandwich structure with the central atom $M^1$.

The formula I also embraces compounds of the formula Ia

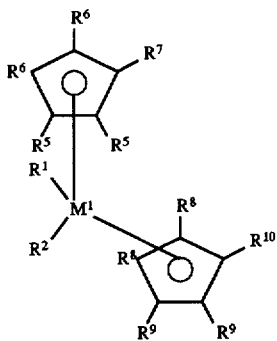
(Ia)

and of the formula Ib

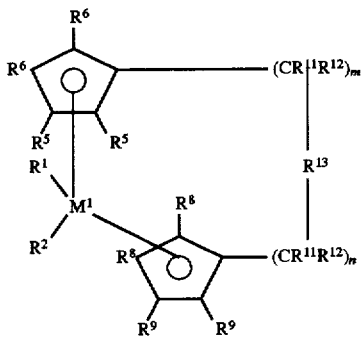
(Ib)

In the formulae Ia and Ib, $M^1$ is a metal of group IVb, Vb or VIb of the Periodic Table of Elements, for example titanium, zirconium, hafnium, vanadium, niobium, tantalum, chromium, molybdenum and tungsten, preferably titanium, zirconium and hafnium.

$R^1$ and $R^2$ are identical or different and are a hydrogen atom, a $C_1$–$C_{10}$-alkyl group, preferably a $C_1$–$C_3$-alkyl group, a $C_1$–$C_{10}$-alkoxy group, preferably a $C_1$–$C_3$-alkoxy group, a $C_6$–$C_{10}$-aryl group, preferably a $C_6$–$C_8$-aryl group, a $C_6$–$C_{10}$-aryloxy group, preferably a $C_6$–$C_8$-aryloxy group, a $C_2$–$C_{10}$-alkenyl group, preferably a $C_2$–$C_4$-alkenyl group, a $C_7$–$C_{40}$-arylalkyl group, preferably a $C_7$–$C_{10}$-arylalkyl group, a $C_7$–$C_{40}$-alkylaryl group, preferably a $C_7$–$C_{12}$-alkylaryl group, a $C_8$–$C_{40}$-arylalkenyl group, preferably a $C_8$–$C_{12}$-arylalkenyl group, or a halogen atom, preferably chlorine or methyl.

$R^3$ and $R^4$ are identical or different and are a mononuclear or polynuclear hydrocarbon radical which may form a sandwich structure with the central atom $M^1$. $R^3$ and $R^4$ are preferably cyclopentadienyl, indenyl, tetrahydroindenyl, benzoindenyl or fluorenyl, it being possible for the parent structures to carry additional substituents or to be bridged with one another.

$R^5$, $R^6$, $R^7$, $R^8$, $R^9$ and $R^{10}$ are identical or different and are a hydrogen atom, a halogen atom, preferably a fluorine, chlorine or bromine atom, a $C_1$–$C_{10}$-alkyl group, preferably a $C_1$–$C_4$-alkyl group, a $C_6$–$C_{10}$-aryl group, preferably a $C_6$–$C_8$-aryl group, a $C_1$–$C_{10}$-alkoxy group, preferably a $C_1$–$C_3$-alkoxy group, or an —$NR^{14}_2$, —$SR^{14}$, —$OSiR^{14}_3$, —$SiR^{14}_3$ or —$PR^{14}_2$ radical in which $R^{14}$ is a $C_1$–$C_{10}$-alkyl group, preferably a $C_1$–$C_3$-alkyl group, or a $C_6$–$C_{10}$-aryl group, preferably a $C_6$–$C_8$-aryl group, or, in the case of Si- or P-containing radicals, also a halogen atom, preferably a chlorine atom, or two adjacent radicals $R^5$, $R^6$, $R^7$, $R^8$, $R^9$ or $R^{10}$ each form a ring with the carbon atoms linking them. Particularly preferred ligands are the substituted compounds of the parent structures indenyl, tetrahydroindenyl, benzoindenyl, fluorenyl and cyclopentadienyl.

$R^{13}$ is

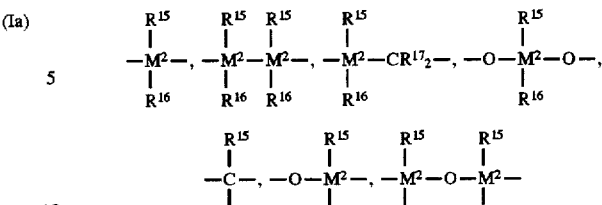

$=BR^{15}$, $=AlR^{15}$, —Ge—, —Sn—, —O—, —S—, $=SO$, $=SO_2$, $=NR^{15}$, $=CO$, $=PR^{15}$ or $=P(O)R^{15}$, in which $R^{15}$, $R^{16}$ and $R^{17}$ are identical or different and are a hydrogen atom, a halogen atom, a $C_1$–$C_{30}$-alkyl group, preferably a $C_1$–$C_4$-alkyl group, in particular a methyl group, a $C_1$–$C_{10}$-fluoroalkyl group, preferably a $CF_3$ group, a $C_6$–$C_{10}$-fluoroaryl group, preferably a pentafluorophenyl group, a $C_6$–$C_{10}$-aryl group, preferably a $C_6$–$C_8$-aryl group, a $C_1$–$C_{10}$-alkoxy group, preferably a $C_1$–$C_4$-alkoxy group, in particular a methoxy group, a $C_2$–$C_{10}$-alkenyl group, preferably a $C_2$–$C_4$-alkenyl group, a $C_7$–$C_{40}$-arylalkyl group, preferably a $C_7$–$C_{10}$-arylalkyl group, a $C_8$–$C_{40}$-arylalkenyl group, preferably a $C_8$–$C_{12}$-arylalkenyl group, or a $C_7$–$C_{40}$-alkylaryl group, preferably a $C_7$–$C_{12}$-alkylaryl group, or $R^{15}$ and $R^{16}$ or $R^{15}$ and $R^{17}$, together with the atoms linking them, each form a ring.

$M^2$ is silicon, germanium or tin, preferably silicon and germanium.

$R^{13}$ is preferably $=CR^{15}R^{16}$, $=SiR^{15}R^{16}$, $=GeR^{15}R^{16}$, —O—, —S—, $=SO$, $=PR^{15}$ or $=P(O)R^{15}$.

$R^{11}$ and $R^{12}$ are identical or different and have the meaning stated for $R^{15}$.

m and n are identical or different and are zero, 1 or 2, preferably zero or 1, m plus n being zero, 1 or 2, preferably zero or 1.

Examples of preferred metallocenes are:
bis(cyclopentadienyl)zirconium dichloride, bis(methylcyclopentadienyl)zirconium dichloride, bis(n-butylcyclopentadienyl)zirconium dichloride, bis(i-butylcyclopentadienyl)zirconium dichloride, bis(alkylcyclopentadienyl)zirconium dichloride, bis(1,2-dimethylcyclopentadienyl)zirconium dichloride, bis(1,3-dimethylcyclopentadienyl)zirconium dichloride, bis(1,2,4-trimethylcyclopentadienyl)zirconium dichloride, bis(1,2,3-trimethylcyclopentadienyl)zirconium dichloride, bis(indenyl)zirconium dichloride, bis(4,5,6,7-tetrahydroindenyl)zirconium dichloride, bis(1-methylindenyl)zirconium dichloride, bis(2-methylindenyl)zirconium dichloride, bis(4-methylindenyl)zirconium dichloride, bis(5-methylindenyl)zirconium dichloride, bis(2-methyl-4,6-di-i-propyl-indenyl)zirconium dichloride, bis(alkylindenyl)zirconium dichloride, bis(cyclopentadienyl)zirconiumdimethyl and bis(cyclopentadienyl)zirconiumdibenzyl, and further preferred metallocenes:
dialkylsilylbis(indenyl)zirconium dichloride, alkylalkylenebis(indenyl)zirconium dichloride, alkylenebis(indenyl)zirconium dichloride, diarylalkenylbis(indenyl)zirconium dichloride, alkylenebis(indenyl)hafnium dichloride, diarylsilylbis(indenyl)zirconium dichloride, dialkylgermylbis(indenyl)zirconium dichloride, (alkyl)(alkenyl)silylbis(indenyl)zirconium dichloride, (aryl)(alkenyl)silylbis(indenyl)zirconium dichloride, dimethylsilylbis(indenyl)zirconium dichloride, ethylenebis(indenyl)zirconium dichloride, diphenylsilylbis(indenyl)zirconium dichloride, dimethylgermylbis(indenyl)zirconium dichloride, bis (pentamethylcyclopentadienyl)zirconium dichloride, dimethylsilyl-bis(1-tetrahydroindenyl)zirconium dichloride, ethylene-bis(1-tetrahydroindenyl)zirconium dichloride, dimethylsilyl-bis-1-(2-methyltetrahydroindenyl)zirconium dichloride, ethylene-bis-1-(2-methyl-tetrahydroindenyl)zirconium dichloride, dimethylsilyl-bis-1-(2,3,5-trimethylcyclopentadienyl) zirconium dichloride, dimethylsilyl-bis-1-(2,4-dimethylcyclopentadienyl)zirconium dichloride, ethylene-bis(1-indenyl)zirconium dichloride, dimethylsilyl-bis(1-indenyl)zirconium dichloride, diphenylsilyl-bis(1-indenyl)zirconium dichloride, dimethylsilyl-bis(1-indenyl)zirconiumdimethyl, dimethylsilyl-bis-1-(2-methyl-indenyl)zirconium dichloride, phenylmethylsilyl-bis-1-(2-methyl-indenyl) zirconium dichloride, dimethylsilyl-bis-1-(2-methyl-4-ethylindenyl)zirconium dichloride, dimethylsilyl-bis-1-(2-methyl-4-i-propylindenyl) zirconium dichloride and ethylene-bis-1-(4,7-dimethyl-indenyl)zirconium dichloride,
and other metallocenes which can be used:
diphenylmethylene(9-fluorenyl)(cyclopentadienyl) zirconium dichloride, dimethylsilyl(9-fluorenyl) (cyclopentadienyl)zirconium dichloride, isopropylidene (9-fluorenyl)(cyclopentadienyl)zirconium dichloride and isopropylidene(1-indenyl)(cyclopentadienyl)zirconium dichloride.

Ethylenebis(indenyl)zirconium dichloride, bis(indenyl) zirconium dichloride, bis(4,5,6,7-tetrahydroindenyl) zirconium dichloride, bis(cyclopentadienyl) zirconiumdimethyl, bis(methylcyclopentadienyl)zirconium dichloride, bis(n-butylcyclopentadienyl)zirconium dichloride and bis(cyclopentadienyl)zirconium dichloride are particularly preferably used.

In principle, any compound which, owing to its Lewis acidity, is capable of converting the neutral metallocene into a cation and stabilizing it ("labile coordination") is suitable as a cocatalyst. In addition, the cocatalyst or the anion formed from it should not undergo any further reactions with the metallocene cation.

The cocatalyst of the catalyst to be used according to the invention is preferably an aluminoxane or another organoaluminum compound. The aluminoxane is a compound of the formula IIa for the linear type and/or of the formula IIb for the cyclic type

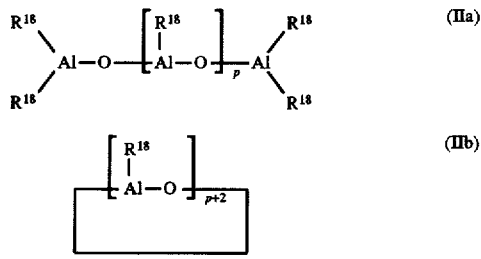

In these formulae, $R^{18}$ is a $C_1$–$C_6$-alkyl group, preferably methyl, ethyl, n-butyl or isobutyl, in particular methyl or butyl, and p is an integer from 4 to 30, preferably 10 to 20, it being possible for radicals $R^{18}$ also to be different. Methylaluminoxane and methylbutylaluminoxane having a methyl:butyl ratio of 100:1 to 1:1 are particularly preferred, butyl being intended to mean n-butyl or isobutyl or n-butyl/ isobutyl mixtures and the radicals having any distribution, preferably a random distribution.

A further possibility is the use of supported aluminoxanes by, for example, suspending the carrier under inert conditions in a solution of at least one alkylaluminum and reacting this suspension with water.

The catalyst to be used according to the invention can be prepared by reacting the transition metal compound with the organoaluminum compound by various methods:

1) The organoaluminum compound is combined, in a suitable solvent, such as, for example, pentane, hexane, heptane, toluene or dichloromethane, with the transition metal compound at a temperature of −20° to +120° C., preferably at −10° to 40° C., by thorough mixing, for example by stirring. The molar ratio Al:$M^1$ is 1:1 to 10,000:1, preferably 10:1 to 2,000:1, and the reaction time is 5 to 120 minutes, preferably 10 to 30 minutes, at an aluminum concentration of more than 0.01 mol/dm³, preferably more than 0.1 mol/dm³, under inert gas.

2) An insoluble or supported aluminoxane, in the form of a suspension having a content of 1 to 40% by weight, preferably 5 to 20% by weight, in an aliphatic, inert suspending agent, such as n-decane, hexane, heptane or diesel oil, is reacted with a finely milled transition metal compound or its solution in an inert solvent, such as toluene, hexane, heptane or dichloromethane, in a molar ratio Al:$M^1$ of 1:1 to 10,000:1, preferably 10:1 to 2,000:1, at a temperature of −20° to +120° C., preferably −20° to 40° C., for a reaction time of 5 to 120 minutes, preferably 10 to 60 minutes, with thorough mixing.

The catalyst thus prepared is either used as a suspension directly for the polymerization or separated off by filtration or decanting and washed with an inert suspending agent, such as toluene, n-decane, hexane, heptane, diesel oil or dichloromethane. After such a wash, it can be metered into the polymerization system either as a powder after drying in vacuo or in solvent-moist form after resuspension as a suspension in an inert suspending agent, such as, for example, toluene, hexane, heptane, diesel oil or dichloromethane.

The catalyst prepared according to 1) or 2) may also be used in prepolymerized form, or the metallocene can be applied to a carrier before being used.

One of the olefins to be polymerized is preferably used for the prepolymerization. Suitable carriers are, for example, silica gel, alumina, solid aluminoxane or other organic or inorganic carriers. A polyolefin carrier is also suitable.

Instead of the organoaluminum compounds, compounds of the formulae $R^{19}{}_x NH_{4-x} BR^{20}{}_4$, $R^{19}{}_x PH_{4-x} BR^{20}{}_4$, $R^{19}{}_3 CBR^{20}{}_4$ or $BR^{20}{}_3$ may also be used as cocatalysts. In these formulae, x is a number from 1 to 4, the radicals $R^{19}$ are identical or different, preferably identical, and are $C_1$–$C_{10}$-alkyl or $C_6$–$C_{18}$-aryl, or two radicals $R^{19}$, together with the atom linking them, form a ring, and the radicals $R^{20}$ are identical or different, preferably identical, and are $C_6$–$C_{18}$-aryl which may be substituted by alkyl, haloalkyl or fluorine. In particular, $R^{19}$ is ethyl, propyl, butyl or phenyl and $R^{20}$ is phenyl, pentafluorophenyl, 3,5-bistrifluoromethylphenyl, mesityl, xylyl or tolyl.

These cocatalysts are particularly suitable in combination with metallocenes of the formula I when $R^1$ and $R^2$ are a $C_1$–$C_{10}$-alkyl group or an aryl or benzyl group, preferably a methyl group. The derivatization to give the metallocenes of the formula I can be carried out by methods known from the literature, for example by reaction with alkylating agents, such as methyllithium (cf. Organometallics 9 (1990) 1539; J. Am. Chem. Soc. 95 (1973) 6263).

When the abovementioned cocatalysts are used, the actual (active) polymerization catalyst comprises the reaction product of metallocene and of one of the stated compounds.

This reaction product is therefore first preferably prepared outside the polymerization reactor in a separate step using a suitable solvent, such as, for example, toluene.

The transition metal component is used in a concentration of, based on the transition metal, $10^{-3}$ to $10^{-7}$, preferably $10^{-4}$ to $10^{-6}$, mol of $M^1$ per $dm^3$ of solvent. The cocatalyst is used in a concentration of, based on the content of aluminum, $10^{-5}$ to $10^{-1}$ mol, preferably $10^{-4}$ to $10^{-2}$ mol, per $dm^3$ of solvent. In principle, however, higher concentrations are also possible.

The polymerization is carried out as a suspension polymerization with evaporative cooling.

Suitable suspending agents are low-boiling hydrocarbons, such as, for example, propane, isobutane or n-butane, or low-boiling halogenated hydrocarbons, such as, for example, methylene chloride, and their mixtures with one another or with other suspending agents, such as hexane, heptane, octane, diesel oils or toluene, or with olefins, as described above. Furthermore, up to 40% by weight of the suspending agent may be liquid olefins. A preferred main component of the suspending agent is propane.

The polymerization is carried out at a temperature of 40°–95° C., at an olefin partial pressure of 0.5 to 30 bar, at a hydrogen partial pressure of 0 to 10 bar, with the addition (based on Al) of 0.01 to 10 mmol of cocatalyst/$dm^3$ of suspending agent and with a catalyst/cocatalyst ratio of 1:1 to 1:1,000.

The total pressure of the system is not more than 150% of the vapor pressure of the suspending agent at the polymerization temperature. It is preferable to use propane as a suspending agent at 60°–80° C. and a total pressure of 23 to 48 bar, particularly preferably at 70° C. and 26 to 39 bar.

In order to regulate the molar weight, hydrogen is additionally introduced or the polymerization temperature is changed, it also being possible to obtain polymers having a broad molecular weight distribution by periodic changes or a defined multistage process.

For the polymerization, another alkylaluminum compound, such as, for example, trimethylaluminum, triethylaluminum, triisobutylaluminum or isoprenylaluminum, may additionally be introduced for rendering the polymerization system inert, in a concentration of 1 to 0.001 mmol of Al per kg of reactor content, before the addition of the catalyst.

In addition, the polymer molecular weight achieved in the process according to the invention is determined by the type of metallocene used, by the Al/Zr ratio of the catalyst system and by the addition and type of further alkylaluminums.

The polymerization is carried out batchwise or continuously in one or more stages, and any residence times can be realized owing to the only slight time-dependent decrease in the polymerization activity.

For the suspension process with evaporative cooling, the narrow molecular weight distribution achievable with metallocene catalyst systems is also advantageous since it makes it possible to achieve a lower proportion of volatile oligomers, which may accumulate in the condensers during prolonged operation.

The polymerization is carried out in an apparatus as shown schematically in the Figure.

In the Figure, the meanings are as follows:

1 Reactor (if necessary with stirrer)
2 Separating column/stillhead
3 Pipeline
4 Condenser
5 Pipeline
6 Equilibrating vessel
7 Pipeline
8 Pump
9 Pipeline
10 Valve
11 Pipeline
12 Valve
13 Feed pipe for monomers and hydrogen
14 Feed pipe for suspending agent
15 Feed pipe for catalyst and cocatalyst
16 Feed pipe for alkylaluminum or additional cocatalyst
17 Discharge pipe The polymerization reactor (1) is equipped with a separating column (stillhead) (2). From this separating column a pipeline (3) leads to a condenser (4), which however may also be connected directly to the separating column (2). A pipeline (5) leads to an equilibrating vessel (6) which is connected via a pipeline (7), a pump (8) and a pipeline (9) to the reactor (1). Downstream of the pump (8), a pipeline (11) leads to the separating column/stillhead (2). The pipeline (9) can be shut off by a valve (10) and the pipeline (11) by a valve (12). The feed pipes (13) and (14) also lead into the reactor (1), the pipe (14) additionally being connected to a feed pipe (15). The reactor (1) can be emptied through the discharge pipe (17). A feed pipe (16) is also connected to the pipeline (7).

The suspending agent present in the reactor (1) is caused to boil by the heat of polymerization and flows through the pipeline (3) into the condenser (4), where it is condensed. Low molecular weight products are retained in the separating column (2). The condensed suspending agent is fed through the pipeline (5) to the equilibrating vessel (6), from where it is removed through the pipeline (7) and is recycled by means of the pump (8) through the pipeline (9) and the valve (10) into the reactor (1). Additional activator (alkylaluminum or cocatalyst) is fed through the pipeline (16) into the stream of the suspending agent. In the preparation of low molecular weight products, some of the suspending agents can be fed through the pipe (11) and the valve (12) into the separating column (2) to support there the recycling of entrained products into the reactor (1). Monomers and hydrogen are fed into the reactor (1) through the feed pipe (13), and fresh suspending agent through the feed pipe (14). The mixture of catalyst and cocatalyst is introduced into the stream of the suspending agent through the feed pipe (15). The polymer wax formed is removed from the reactor (1) through the discharge pipe (17).

In order to increase the yield, or for a two-stage process, a second reactor may be arranged downstream of the suspension discharge (17).

In order to increase the solids content at the suspension discharge, the latter can be mounted on a sedimentation part in the reactor bottom. This reduces the proportion of monomers dissolved in the suspending agent and the operating costs for recycling the suspending agent and maintaining the cocatalyst level in the reactor.

The catalyst can be metered as a solution or in supported form as a suspension. For preactivation, some of the cocatalyst (30 to 80 mol %, based on Al) is mixed with the catalyst at least 10 minutes before metering into the reactor or is already part of the supported catalyst. The catalyst solution thus prepared can be metered into the reactor either directly or preferably in dilute form via the feed pipe (14) of the suspending agent.

In order to regulate the cocatalyst level, the cocatalyst may furthermore be metered separately and together with further alkylaluminums into the reactor or into the condensate return (7).

In general, hydrocarbons, such as toluene, heptane, hexane, pentane, butane or propane, and industrial diesel oils are suitable as solvents or suspending agents for catalyst or cocatalyst.

It is in general possible to dispense with stirring of the reactor content since the boiling suspending agent produces good circulation.

Further processing of the suspension of wax and low boilers, conventional methods for wax processing can be used after the pressure has been released.

The polyolefin wax prepared according to the invention is separated from the suspending agent and dried.

Polyethylene waxes prepared according to the invention are composed of 100 to 80% by weight, based on the total polymer, of ethylene units and 0 to 20% by weight, based on the total polymer, of units which are derived from another olefin, a diolefin or another unsaturated hydrocarbon, in particular propylene, 1-butene, 2-butene, 4-methyl-1-pentene or 1-hexene. They have an average molecular weight $M_w$ of about 500 to about 50,000, preferably about 1,000 to about 30,000. The molecular weight distribution (polydispersity) $M_w/M_n$ is extremely narrow and is about 1 to 5, preferably 1 to 3. The melting range of the wax can be adjusted as required from about 126° to 132° C. for a homopolymer down to about 80° to 90° C. by copolymerization.

Polypropylene waxes prepared according to the invention are composed of 80 to 100, preferably 90 to 100, % by weight, based on the total polymer, of propylene units and 0 to 20, preferably 0 to 10, % by weight, based on the total polymer, of units which are derived from ethylene or one of the other olefins described above. They have an average molecular weight $M_w$ of 1,000 to 50,000 g/mol, preferably 8,000 to 45,000 g/mol, a polydispersity $M_w/M_n$ of 1 to 5, preferably 1 to 3, a melting point of 50° to 160° C., preferably 90° to 160° C., a melt viscosity of 100 to 80,000 mPa.s, preferably 120 to 50,000 mPa.s, at 170° C. and a random distribution of the comonomer units in the polymer chain.

The evaporative cooling requires as high a proportion as possible of condensable gases in the vapor space and is therefore useful only in the case of catalyst systems which polymerize with very high conversions even at low ethylene pressure. Also advantageous for carrying out the evaporative cooling is the low hydrogen partial pressure which, owing to the good hydrogen response characteristics of the metallocene catalysts, is required for achieving the polymer molecular weights typical of waxes.

A further advantage of the evaporative cooling is the avoidance of a reduction in the cooling capacity of the polymerization reactor through the build-up of wall deposits. Furthermore, dispensing with wall cooling results in reduced deposit formation. The combination of evaporative cooling with back-washing makes it possible to free the upper part of the reactor continuously or discontinuously from product particles, with the result that shutdowns for cleaning the pipelines and condenser to remove entrained particles can be avoided. The introduction of back-washing thus permits continuous operation.

A further advantage of this polymerization process is the high space-time yield which can be realized by the efficient evaporative cooling, regardless of the size of the polymerization system.

The Examples which follow are intended to illustrate the invention in detail.

The meanings are as follows:

| | | |
|---|---|---|
| VN = | Viscosity number in cm³/g | |
| $M_w$ = | Weight average molecular weight | determined by gel permeation chromatography |
| $M_n$ = | Number average molecular weight | |
| $M_w/M_n$ = | Polydispersity | (Numerical data in g/mol) |
| MV = | Melt viscosity, determined using a rotational viscometer at 140° C. | |
| BD = | Bulk density of the polymer powder in g/dm³ | |

Melting points, crystallization points, the half-widths thereof, the enthalpies of fusion and of crystallization and the glass transition temperatures ($T_g$) were determined by DSC measurements (10° C./min heating/cooling rate).

EXAMPLES

All glass apparatuses were heated in vacuo and flushed with argon or nitrogen. All operations were carried out in the absence of moisture and oxygen in Schlenk vessels. The solvents used were each freshly distilled over Na/K alloy under argon and stored in Schlenk vessels.

The stated polymer melting points are taken from a DSC measurement for the second melting (10° C./min). The isotactic index was determined from FT-IR spectra without prior extraction of the sample, via the intensity ratio of the bands at 998 cm⁻¹ and 972 cm⁻¹, according to Dechant, "IR-spectroskopische Untersuchungen von Polymeren" [IR spectroscopic investigations of polymers], Akademie Vlg., Berlin 1972.

Methylaluminoxane was obtained commercially as a 10% strength toluene solution and, according to the aluminum determination, contained 36 mg of Al/cm³. The average degree of oligomerization according to the freezing point depression in benzene was n=20.

The aluminum determination was carried out by complexometric titration according to Schwarzenbach, after hydrolysis with water and sulfuric acid.

The polymerizations were carried out in an apparatus similar to that shown in the Figure.

Example 1

30 kg of propane and 2.70 kg of propylene and 100 cm³ of a solution of methylaluminoxane in toluene were introduced into an apparatus according to the Figure having a 100 dm³ vessel and flushed with nitrogen 0.5 bar hydrogen and 4 bar ethylene were fed in while stirring at 170 rpm.

At the same time, 35 mg of bis(indenyl)zirconium dichloride were dissolved in 100 cm³ of the solution of methylaluminoxane in toluene and stirring was carried out for 15 minutes.

The stirrer in the reactor was switched off and the polymerization was started by pumping in the catalyst solution over 10 minutes. The internal temperature of the reactor increased rapidly and was regulated at 70° C. by subsequently feeding in ethylene. The relative concentration of the gases in the vapor space of the reactor was monitored with the aid of a gas chromatograph (GC). Hydrogen and propylene were subsequently metered in at a constant ratio to the ethylene according to GC. A total pressure of 30 bar was achieved at equilibrium.

The valves (10) and (12) were set so that the pump (8) delivered 10% by volume of the circulation via pipe (11) into the stillhead (2) of the reactor (1). After a polymerization time of 1 hour, the propane wax suspension was discharged into a processing vessel and the catalyst was deactivated by adding isopropanol. After the propane had been distilled off and the product dried at reduced pressure, 11.2 kg of copolymer wax having a VN of 22 cm$^3$/g, a melting point (DSC) of 112° C. and a DSC enthalpy of fusion of 138 J/g were obtained when the processing vessel was opened. The viscosity of the melt was 1,200 mPa.s at 140° C. The propylene content was 4.4 mol % according to $^{13}$C-NMR.

The experiment was repeated four times. The yield remained constant at about 5% by weight. After the reactor was opened, no wall deposits were found, apart from finely divided product residues on the bottom.

Comparative Example A

Example 1 was repeated, the double jacket of the reactor being connected to a thermostat system and pipe (3) and valves (10) and (12) being closed. The polymerization was then continued at 30° C. by adding the catalyst and thereafter with cooling to an internal reactor temperature of 70° C. Ethylene was continuously metered in up to a total pressure of 30 bar, and propylene and hydrogen were added in accordance with the results of the GC measurement.

After 1 hour, 10.5 kg of copolymer wax having a VN of 19 cm$^3$/g and a melt viscosity of 800 mpa.s at 140° C. resulted.

The experiment was repeated four times. The difference between jacket temperature and internal reactor temperature increased with progressive operating time. After the reactor had been opened, a cohesive wax deposit having a thickness of about 0.5 mm was found on the inner wall of the reactor.

Comparative Example B

Example 1 was repeated, the valve (12) remaining closed during operation.

After the processing vessel had been opened, 11.6 kg of copolymer wax having a VN of 20 cm$^3$/g and a melt viscosity of 910 mPa.s at 140° C. were obtained. The experiment was repeated four times. After the reactor had been opened, no wall deposits were found, as in Example 1. Loose deposits of a fine material were found in the reactor stillhead (2) and partly in the pipe (3). The VN of 18 cm$^3$/g indicated that the deposits were composed mainly of entrained product and only to a small extent of oligomers.

We claim:

1. A process for the preparation of a polyolefin wax by polymerization or copolymerization of olefins or diolefins at a temperature in the range of −40° to 95° C., at a pressure in the range of 0.5 to 120 bar, in a suspension in the presence of a catalyst comprising a metallocene and a cocatalyst selected from the group consisting of an organoaluminum compound, $R^{19}_x NH_{4-x} BR^{20}_4$, $R^{19}_x PH_{4-x} BR^{20}_4$, $R^{19}_3 CBR^{20}_4$ or $BR^{20}_3$ where x is a number from 1 to 4, the radicals $R^{19}$ are identical or different, and are $C_1-C_{10}$-alkyl or $C_6-C_{18}$-aryl, or two radicals $R^{19}$, together with the atom linking them, form a ring, and the radicals $R^{20}$ are identical or different, and are an unsubstituted or substituted $C_6-C_{18}$-aryl wherein the substituents are selected from the group consisting of alkyl, haloalkyl and fluorine, and wherein the metallocene is a compound of the formula I

in which $M^1$ is a metal of group IVb, Vb or VIb of the Periodic Table of Elements, $R^1$ and $R^2$ are identical or different and are a hydrogen atom, a $C_1-C_{10}$-alkyl group, a $C_1-C_{10}$-alkoxy group, $C_8-C_{10}$-aryl group, a $C_6-C_{10}$-aryloxy group, a $C_2-C_{10}$-alkenyl group, a $C_7-C_{40}$-arylkyl group, a $C_7-C_{40}$-alkylaryl group, a $C_8-C_{40}$-arylalkenyl group or a halogen atom and $R^3$ and $R^4$ are identical or different and are a mononuclear or polynuclear hydrocarbon radical, and wherein hydrocarbons having 3 carbon atoms or a halogenated hydrocarbon which boils at a temperature not higher than 95° C. are used as suspending agents.

2. The process as claimed in claim 1, which further comprises removing heat from the reaction zone by evaporative cooling.

3. The process as claimed in claim 2, wherein the metallocene is a compound of the formula Ia

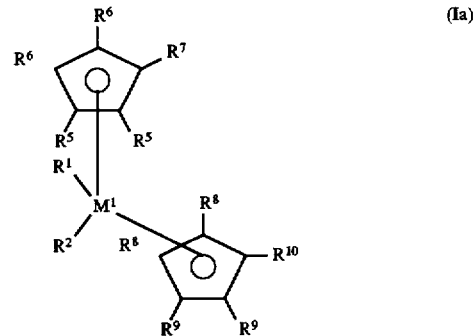

in which $R^1$ and $R^2$ have the meaning stated in claim 1 and $R^5$, $R^6$, $R^7$, $R^8$, $R^9$ and $R^{10}$ are identical or different and are a hydrogen atom, a halogen atom, a $C_1-C_{10}$-alkyl group, a $C_6-C_{10}$-aryl group, a $C_1-C_{10}$-alkoxy group or an $-NR^{14}_2$, $-SR^{14}$, $-OSiR^{14}_3$, $-SiR^{14}_3$ or $-PR^{14}_2$ radical in which $R^{14}$ is a $C_1-C_{10}$-alkyl group or $C_6-C_{10}$-aryl group or, in the case of Si- or P-containing radicals, also a halogen atom, or two adjacent radicals $R^5$, $R^6$, $R^7$, $R^8$, $R^9$ or $R^{10}$ each form a ring with the carbon atoms linking them.

4. The process as claimed in claim 2, wherein the metallocene is a compound of the formula Ib

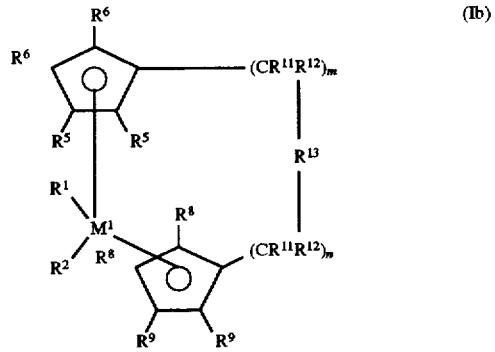

in which $R^1$ and $R^2$ have the meaning stated in claim 1, $R^5$, $R^6$, $R^8$, $R^9$ and $R^{14}$ have the meaning stated in claim 2 and $R^{13}$ is $$-\underset{R^{16}}{\overset{R^{15}}{M^2}}-, \quad -\underset{R^{16}}{\overset{R^{15}}{M^2}}-\underset{R^{16}}{\overset{R^{15}}{M^2}}-, \quad -\underset{R^{16}}{\overset{R^{15}}{M^2}}-CR^{17}{}_2-, \quad -O-\underset{R^{16}}{\overset{R^{15}}{M^2}}-O-,$$

$$-\underset{R^{16}}{\overset{R^{15}}{C}}-, \quad -O-\underset{R^{16}}{\overset{R^{15}}{M^2}}-, \quad -\underset{R^{16}}{\overset{R^{15}}{M^2}}-O-\underset{R^{16}}{\overset{R^{15}}{M^2}}-$$

$=BR^{15}$, $=AlR^{15}$, —Ge—, —Sn—, —O—, —S—, =SO, $=SO_2$, $=NR^{15}$, =CO, $=PR^{15}$ or $P(O)R^{15}$, in which $R^{15}$, $R^{16}$ and $R^{17}$ are identical or different and are a hydrogen atom, a halogen atom, a $C_1$–$C_{30}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{15}$ and $R^{16}$ or $R^{15}$ and $R^{17}$, together with the atoms linking them, each form a ring, $M^2$ is silicon, germanium or tin and $R^{11}$ and $R^{12}$ are identical or different and have the meaning stated for $R^{15}$.

m and n are identical or different and are zero, 1 or 2, m plus n being zero, 1 or 2.

5. The process as claimed in claim 4, wherein m plus n are zero or 1.

6. The process as claimed in claim 2, wherein the cocatalyst is an aluminoxane of the formula IIa for the linear type and/or of the formula IIb for the cyclic type $$\underset{R^{18}}{\overset{R^{18}}{\diagdown}}Al-O-\left[\underset{}{\overset{R^{18}}{|}}Al-O\right]_p-Al\underset{R^{18}}{\overset{R^{18}}{\diagup}} \quad (IIa)$$

$$\left[\underset{}{\overset{R^{18}}{|}}Al-O\right]_{p+2} \quad (IIb)$$

in which $R^{18}$ is a $C_1$–$C_6$-alkyl group and p is an integer from 4 to 20.

7. The process as claimed in claim 2, wherein the suspending agent is propane.

8. The process as claimed in claim 7, wherein the metallocene is bis(indenyl)zirconium dichloride.

9. The process as claimed in claim 2, wherein a catalyst which is present on a carrier is used.

10. The process as claimed in claim 2, wherein ethylene, propylene, 1-butene, 4-methyl-1-pentene or 1-hexene is polymerized.

11. The process as claimed in claim 2, wherein the evaporative cooling is operated in combination with backwashing.

12. The process as claimed in claim 11, wherein the metallocene is bis(indenyl)zirconium dichloride; the suspending agent is propane and the catalyst which is present on a carrier is used.

13. The process as claimed in claim 2, wherein $M^1$ is Ti, Zr or Hf.

14. The process as claimed in claim 13, wherein $M^1$ is Zr or Ti.

15. The process as claimed in claim 13, wherein $M^1$ is zirconium.

16. The process as claimed in claim 2, wherein the metallocene is bis(indenyl)zirconium dichloride.

17. The process as claimed in claim 2, wherein said temperature is in the range of 60° to 80° C.

18. A process for the preparation of a polyolefin wax by suspension polymerization or copolymerization of at least one olefin, comprising: conducting the polymerization or copolymerization in a reaction zone at a temperature in the range of –40° to 95° C. and a pressure in the range of 0.5 to 120 bar, in a suspending medium comprising a hydrocarbon having 3 carbon atoms or a halogenated hydrocarbon which boils at a temperature not higher than 95° C. and a pressure in the range of 0.5 to 120 bar, in the presence of a catalyst comprising a metallocene and a cocatalyst selected from the group consisting of an organoaluminum compound, $R^{19}{}_xNH_{4-x}BR^{20}{}_4$, $R^{19}{}_xPH_{4-x}BR^{20}{}_4$, $R^{19}{}_3CBR^{20}{}_4$ or $BR^{20}{}_3$ where x is a number from 1 to 4, the radicals $R^{19}$ are identical or different, and are $C_1$–$C_{10}$-alkyl or $C_6$–$C_{18}$-aryl, or two radicals $R^{19}$, together with the atom linking them, form a ring , and the radicals $R^{20}$ are identical or different, and are an unsubstituted or substituted $C_6$–$C_{18}$-aryl wherein the substituents are selected from the group consisting of alkyl, haloalkyl and fluorine, and wherein the metallocene is a compound of the formula I $$R^1-\underset{\underset{R^2}{|}}{\overset{\overset{R^3}{|}}{M^1}}-R^4 \qquad (I)$$

in which $M^1$ is a metal of group IVb, Vb or VIb of the Periodic Table of Elements, $R^1$ and $R^2$ are identical or different and are a hydrogen atom, a $C_1$–$C_{10}$-alkyl group, a $C_1$–$C_{10}$-alkoxy group, $C_6$–$C_{10}$-aryl group, a $C_6$–$C_{10}$-aryloxy group, a $C_2$–$C_{10}$-alkenyl group, a $C_7$–$C_{10}$-arylalkyl group, a $C_7$–$C_{40}$-alkylaryl group, a $C_8$–$C_{40}$-arylalkenyl group or a halogen atom and $R^3$ and $R^4$ are identical or different and are a mononuclear or polynuclear hydrocarbon radical.

19. The process as claimed in claim 18, which further comprises removing heat from the reaction zone by evaporative cooling, the suspending medium serving also as the evaporative cooling medium.

20. The process as claimed in claim 19, wherein the walls of the reactor which encloses the reaction zone are not cooled, and the suspending medium boils in the reaction zone and is condensed external to the reaction zone.

21. The process as claimed in claim 20, wherein the proportion of condensable gases in the space within the reaction zone is maximized, and said metallocene is selected for maximum hydrogen response characteristics.

22. The process as claimed in claim 21, wherein the metallocene is bis(indenyl)zirconium dichloride; the suspending agent is propane and the catalyst which is present on a carrier is used.

* * * * *

UNITED STATES PATENT AND TRADEMARK OFFICE
CERTIFICATE OF CORRECTION

PATENT NO.  : 5,750,813
DATED       : May 12, 1998
INVENTOR(S) : Reiner Hess, Hartmut Voigt, Hans-Friedrich Herrmann, Ludwig Bohm It is certified that error appears in the above-identified patent and that said Letters Patent is hereby corrected as shown below:

On the title page, Item 73 delete "Clarian & GmbH" and insert

- - Clariant GmbH - - thereof.

Signed and Sealed this

First Day of September, 1998

*Attest:*

BRUCE LEHMAN

*Attesting Officer*  *Commissioner of Patents and Trademarks*